Nov. 10, 1925.  1,560,702

C. A. LE CAMUS

SPRING DEVICE FOR BICYCLES

Filed Feb. 1, 1924  5 Sheets-Sheet 1

Nov. 10, 1925.  
C. A. LE CAMUS  
1,560,702  
SPRING DEVICE FOR BICYCLES  
Filed Feb. 1, 1924　　5 Sheets-Sheet 2
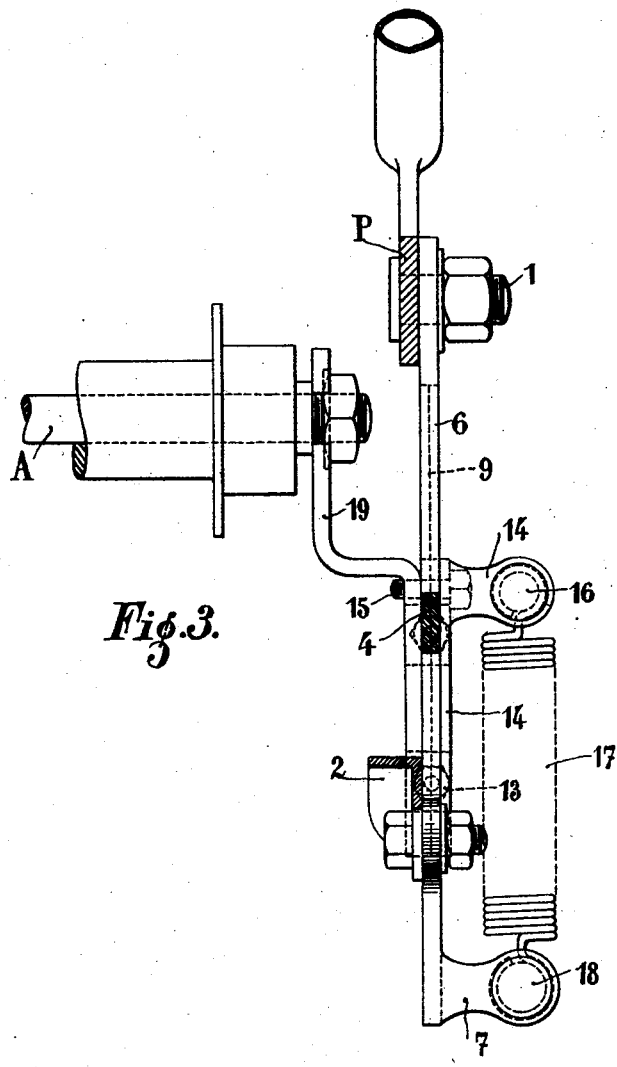
Fig.3.
Fig.4.
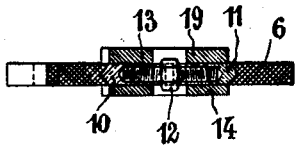
Inventor  
Charles Alphonse Le Camus  
By  
B. Singer, Atty.

Nov. 10, 1925.
C. A. LE CAMUS
1,560,702
SPRING DEVICE FOR BICYCLES
Filed Feb. 1, 1924    5 Sheets-Sheet 3
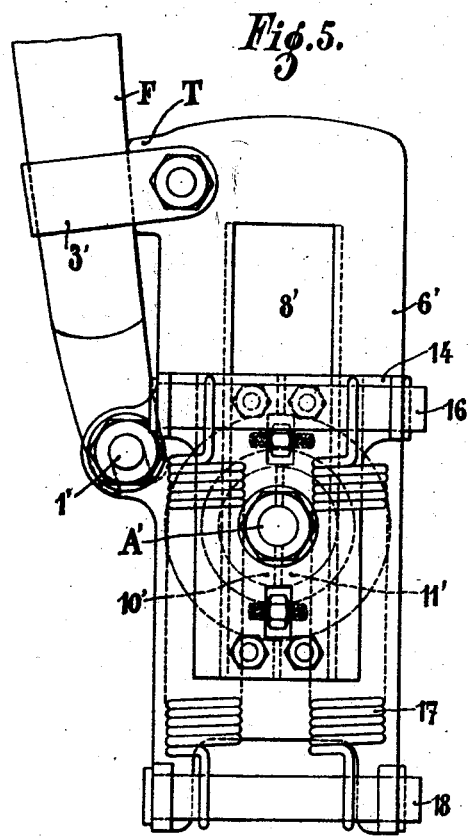
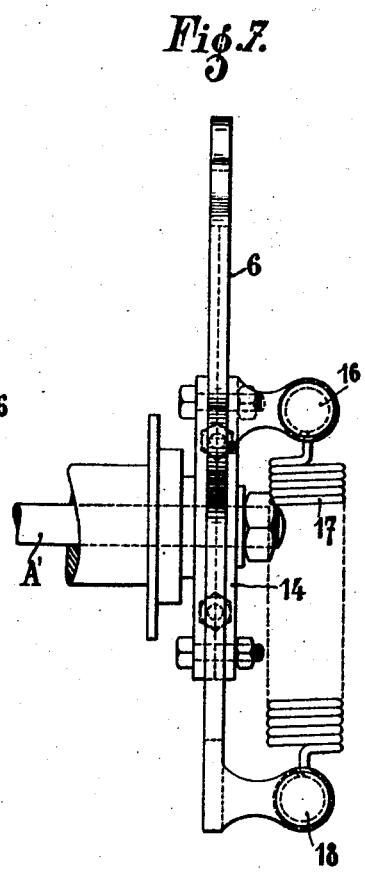
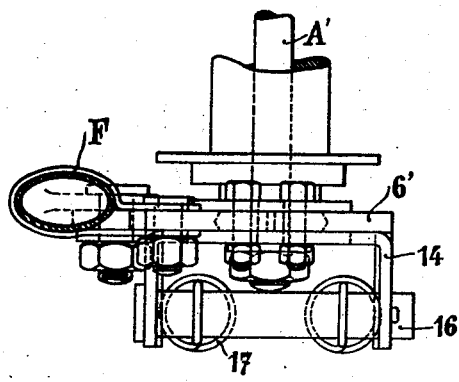

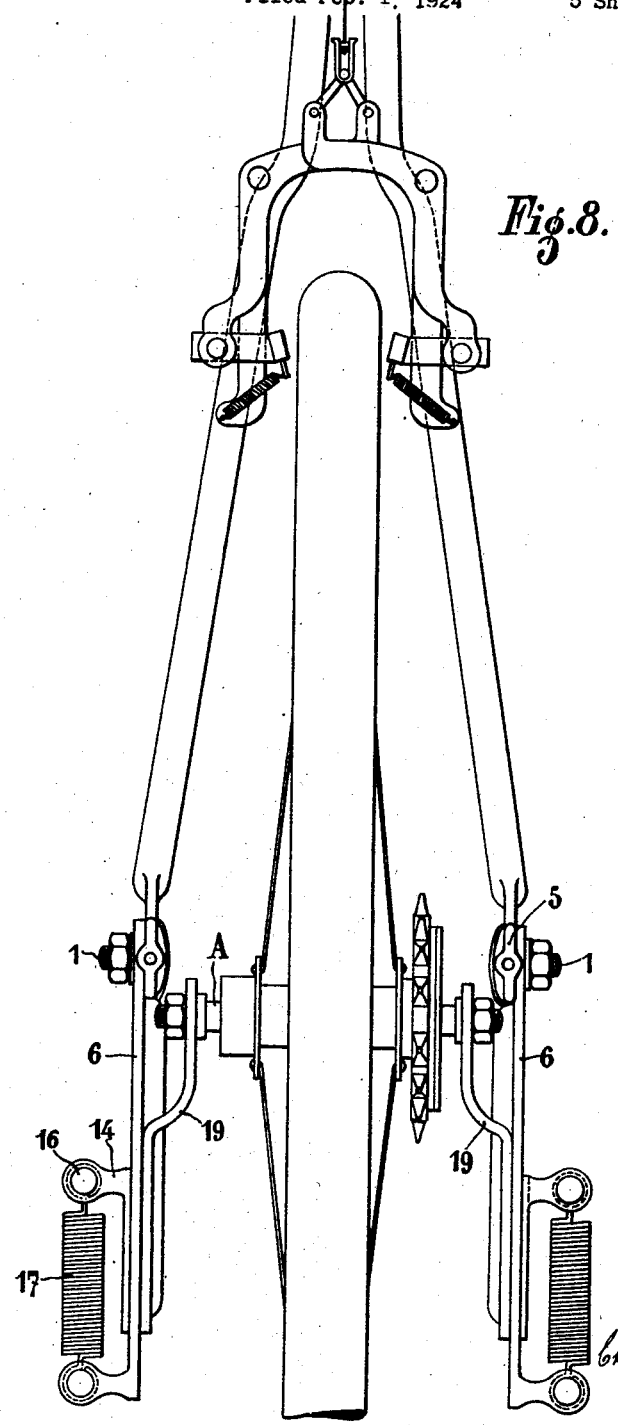

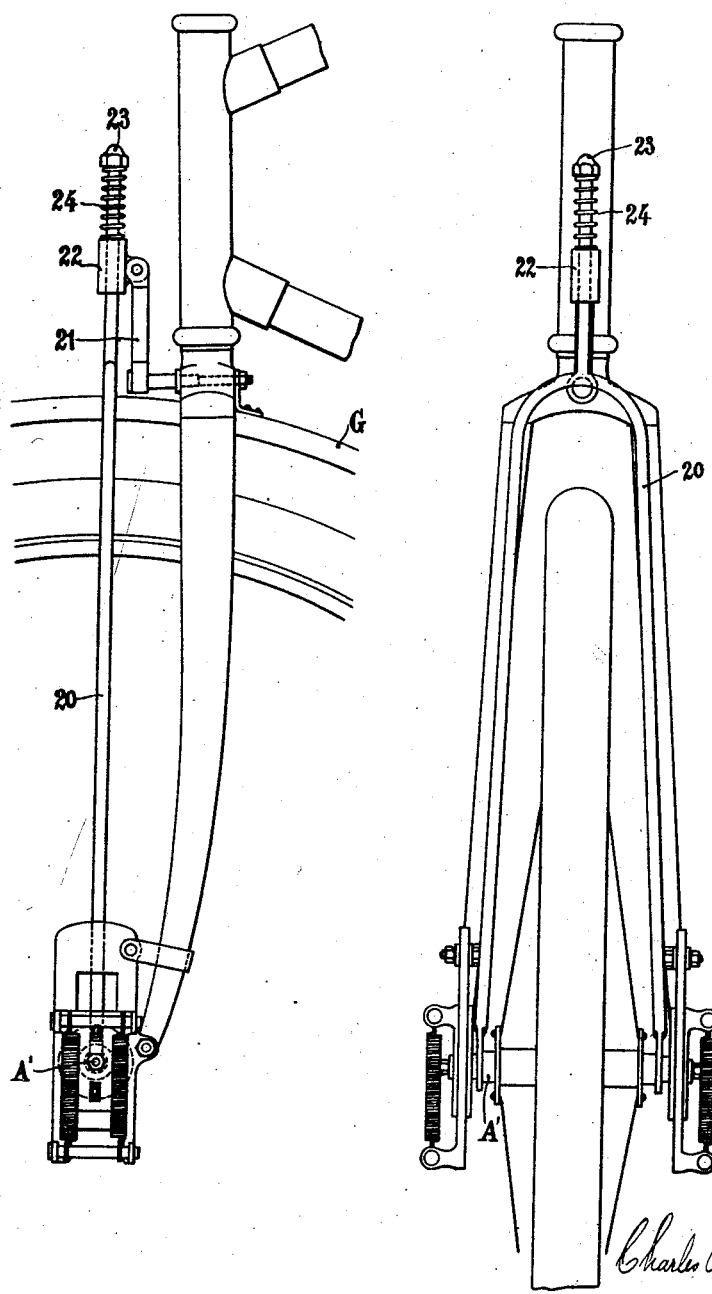

Patented Nov. 10, 1925.

1,560,702

UNITED STATES PATENT OFFICE.

CHARLES ALPHONSE LE CAMUS, OF BILLANCOURT, FRANCE.

SPRING DEVICE FOR BICYCLES.

Application filed February 1, 1924. Serial No. 689,989.

*To all whom it may concern:*

Be it known that I, CHARLES ALPHONSE LE CAMUS, a citizen of France, and a resident of Billancourt, in the Department of Seine, France, have invented certain new and useful Improvements in Spring Devices for Bicycles, of which the following is a specification.

The invention relates to spring devices for bicycles and its object is to provide spring means for bicycles applicable to the rear wheel as well as to the front wheel and effective to neutralize shifting of the weight of the cyclist incident to his movements and providing an improved elastic system interposed between the frame of the bicycle and the axis of the wheel. With the above and other objects in view, the invention consists in the construction, combination and arrangement of devices hereinafter described and claimed.

Some modes of execution of the invention are represented in the annexed drawings.

Fig. 3 is a lateral view, some parts being cut away for better clearness of the drawings;

Fig. 4 is a horizontal section according to line $a$—$a$ of Fig. 1;

Fig. 5 represents a front elevation of a spring device of the same type as the preceding one, applied to the front wheel of a bicycle;

Fig. 6 is a plan view of the same;

Fig. 7 is a lateral elevation of the spring device;

Fig. 8 is a rear view of a bicycle completely fitted out with spring devices constituting the subject matter of this invention;

Figure 1:
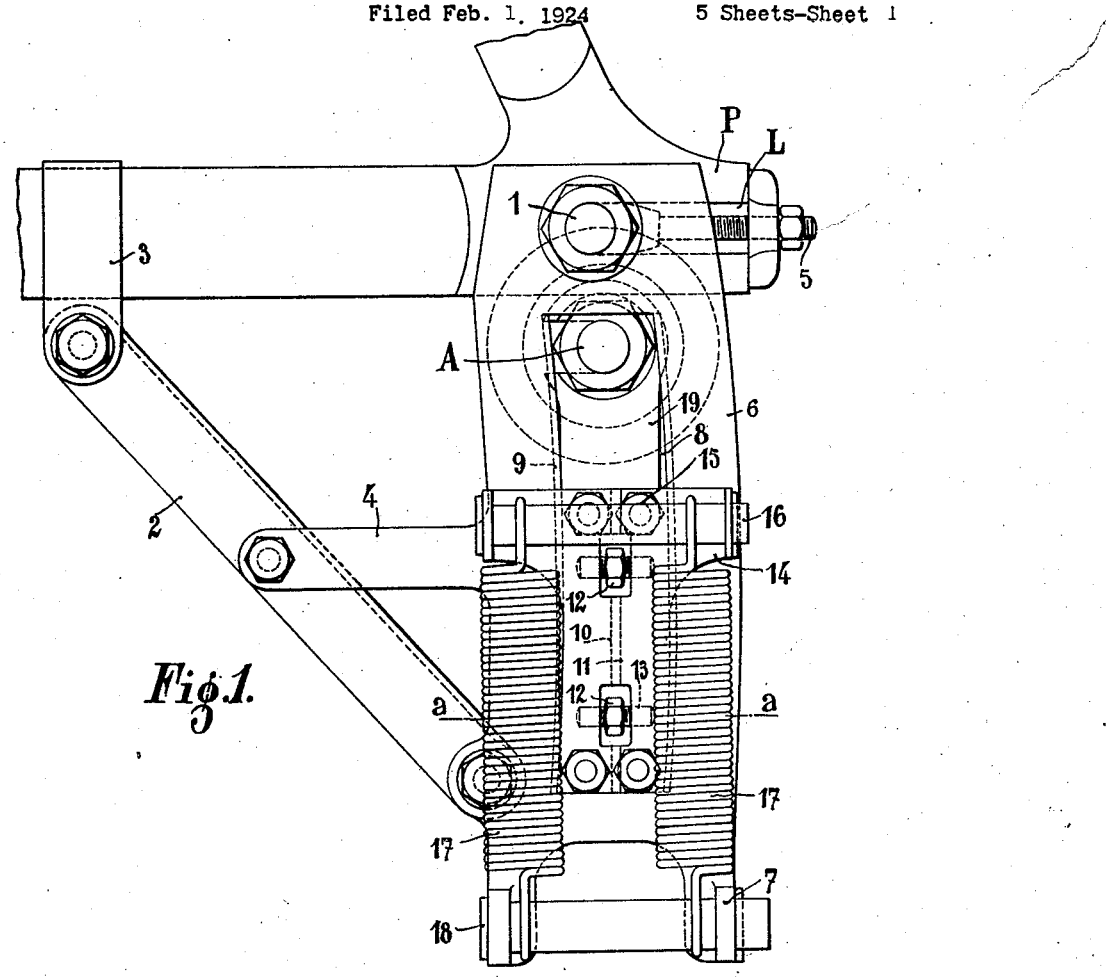
Figure 1 represents a front elevation of a spring device applied to the rear wheel of a bicycle.
Figure 2:
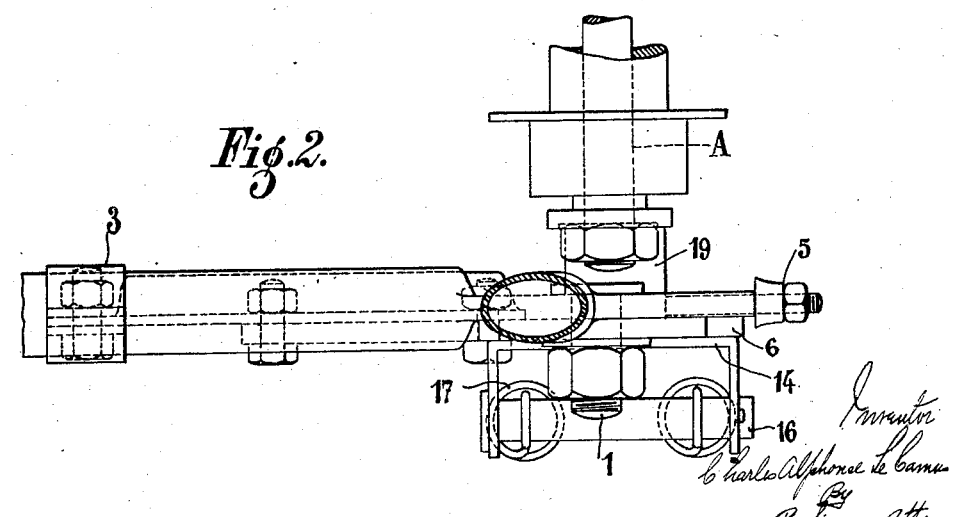
Fig. 2 is a plan view of the same.

The Figures 9 and 10 represent spring devices applied to a front wheel of a bicycle with a complemental deadening device which is especially adapted for use for the front wheel.

With reference to Figures 1 to 4 representing a spring device applied to the rear wheel it will be noted that the axle A of the wheel carries the leg of the fork P; the axle of the wheel being situated lower than the axis of this leg.

In the usual end L of the leg of the fork P is a bolt 1 arranged to fix the device to the frame in connection with other suitable means, such as an angle iron 2 connected to a collar 3 provided on the tube of the rear fork, and an extension 4 of the device, connected to the angle iron. The iron 2 as well as the extension 4 may be made in one piece with the suspension plate.

The usual chain stretcher 5 is fixed to the bolt 1, because the axle A of the wheel is carried by the device.

One of my improved devices only is visible in Fig. 1, a similar one being fixed in an analogous manner on the other leg of the fork.

The suspension device embodies a cut out steel plate 6 having an extension 4 therefrom, and spaced lower arms 7 which are slightly curved.

The opposing inner edges of the arms 7 are grooved as at 9 to form ways on the reception of slides or pads 10 and 11 of metal. These slides or pads are in two parts to facilitate assembling and may be adjusted and made up for play or by means of tie bolts 13 having left hand and right hand threads and a hexagon 12 in the middle in rigid connection with the tie bolt in order to make up for play by lateral displacement of the said slides or pads.

On the face of the plate 6 is a member 14 bolted at 15 to the pads 10, 11 and carrying an axle 16 to which are attached springs 17 connected at their other extremities to an axle 18 carried by the plate 6.

On the rear face of the plate 6 is a plate 19 bent twice at right angles. This plate carries the one extremity of the axle A of the wheel whilst the other plate of the suspension system, applied on the other side, carries the opposite extremity of the axle A.

Said plate 19 is secured to the members 10, 11 and 14 by the bolts 15 and hence is movable vertically with said members. Hence it will be understood that the springs 17 having a fixed point at 18 and a movable point at 16, may lengthen themselves owing to the shifting effort produced by the weight of the cyclist when the wheel passes over uneven parts of the soil, and deaden thereby any shocks and the like.

The device as specified above may also be applied to the rear wheel.

For the front wheel the suspension is always double, and its manner of fitting is equivalent to that of the rear wheel.

For use on a front wheel it will be observed, that the central part 8' is rectilinear instead of being curved and that the fixation of this plate is effected directly on the extremity of the fork F by means of a bolt 1' with a nut and by means of a collar 3'. A projection T on the plate abuts against the fork, near the said collar. In the front suspension, the axle A' of the wheel is carried directly by the pads 10' and 11'. The arrangement could be also effected in such manner that instead of two pads one pad only could be employed, with guiding cheeks on the faces of the plate 6', in which case this plate ought to be in two parts for fitting purposes, assembled thereafter in any convenient way.

The Figures 9 and 10 represent the suspension device on a front wheel with a complemental deadening device.

This device is provided in order to avoid pinching of the pads in the ways 9, especially when turning. It consists of a guiding fork 20, the branches of which are fixed with their lower parts on the axle A' of the wheel, at each side of the suspension apparatus. The upper part of the fork is held by a support 21 provided with a slide 22 fixed on the head of the fork of the bicycle, utilizing the hole pierced in the latter and serving generally for the fixation of a mud guard. A spring 24 is interposed between the slide 22 and a regulating screw or nut 23, this spring which may be compressed by the nut, being for the purpose of avoiding too sudden returns after shocks. The whole, constituted by the fork with its parts assures the working of the pads in their slides of the fixed plate.

What I claim, is:

1. In spring devices for bicycles, a plate to be fixed to the fork prong, means in this plate to carry the axle of the wheel, and springs to permit adjustability of said means in said plate, in accordance with shocks due to the unevenness of the road, to absorb the same.

2. In spring devices for bicycles, a plate to be fixed to the prong of the fork, central slides in this plate, pads to move in said slides, means to adjust the pads to prevent their play in the said slides, a plate fixed to said pads to carry the axle of the wheel, another plate fixed to the pads to carry springs, and means on the fixed plate, to fasten thereon the opposite ends of the said springs.

3. In spring devices for bicycles, one plate fixed to the prong of the fork, pads to move in excavations of said plate, means on said pads to support the axle of the wheel, means on said plate to adjust the same to avoid play, a plate movable in front of said pads to carry the springs and means to fasten the opposite ends of said springs.

4. In spring devices for bicycles, plates fixed to the prongs of the forks, pads to move in excavations of said plates, means on said pads to support the axle of the wheel, springs to support adjustably said pads, guides on said plates to guide said pads, and means to adjust laterally said pads to prevent their play in the guides.

5. In suspensions for bicycles, plates fixed to the prongs of the forks, excavations in said plates, two pads in each plate, springs to support adjustably said pads, means on said pads to support the axle of the wheel, and tie bolts with right hand thread and left hand thread and a hexagon in the middle, to adjust said pads in said excavations to avoid their play.

6. In spring devices for bicycles, for the rear wheel, plates fixed to the prongs of the forks, means adjustable in said plates to support the axle of the wheel, springs attached to said means on one hand and to said plates on the other hand to absorb the shocks, bolts to fix the plates to the prongs of the fork, collars on the fork and means between said collars and said plates to afford a rigid attachment of the whole system to the cycle.

7. In spring devices for bicycles, plates fixed to the prongs of the fork, means adjustable in said plates to support the axle of the wheel, springs between said means and said plate to absorb the shocks, bolts to fix said plates to said prongs, and chain stretchers disposed to act on said bolts, to avoid their acting on the axle of the wheel (rear wheel).

8. In spring devices for bicycles, for the front wheel, plates fixed to the prongs of the fork, excavations in said plates, pads adjustable in said plates to carry directly the axle of the wheel, springs to afford adjustability of said pads and to absorb the shocks, and means to assure a rigid connection of the whole system to the frame of the cycle.

9. In spring devices for bicycles, plates to be fixed to the prongs of the forks, adjustable pads on said plates, means on said pads to carry the axle of the wheel, springs between said plates and said pads to afford shock absorbing means, additional forks, means to support the latter on the axle of the wheel, means to fix the upper part of said additional forks on the head of the main fork and means to assure the evitation of sudden returns after shocks.

10. In spring devices for bicycles, plates to be fixed to the prongs of the forks, adjustable pads on said plates, means on said pads to carry the axle of the wheel, springs between said plates and said pads to afford shock absorbing means, additional forks, on the axle of the wheel, and a slide, a spring and a nut to fix the upper part of said additional fork on the head of the main fork, to avoid sudden returns after shocks.

In witness whereof I affix my signature.

CHARLES ALPHONSE LE CAMUS.